US006678790B1

(12) United States Patent
Kumar

(10) Patent No.: US 6,678,790 B1
(45) Date of Patent: *Jan. 13, 2004

(54) MICROPROCESSOR CHIP HAVING A MEMORY THAT IS RECONFIGURABLE TO FUNCTION AS ON-CHIP MAIN MEMORY OR AN ON-CHIP CACHE

(75) Inventor: Rajendra Kumar, Sunnyvale, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 566 days.

(21) Appl. No.: 08/871,295

(22) Filed: Jun. 9, 1997

(51) Int. Cl.$^7$ ................................................ G06F 12/06
(52) U.S. Cl. ....................................... 711/118; 711/133
(58) Field of Search ........................... 365/49; 711/118, 711/170, 173, 123, 125, 126, 133, 129, 120, 127, 134, 157

(56) References Cited

U.S. PATENT DOCUMENTS

| | | | | |
|---|---|---|---|---|
| 5,067,078 A | * | 11/1991 | Talgam et al. | 395/400 |
| 5,155,833 A | * | 10/1992 | Cullison et al. | 711/118 |
| 5,367,653 A | * | 11/1994 | Coyle et al. | 395/400 |
| 5,410,669 A | * | 4/1995 | Biggs et al. | 395/425 |
| 5,586,293 A | * | 12/1996 | Baron et al. | 711/118 |
| 5,651,134 A | * | 7/1997 | Glott | 395/445 |
| 5,680,363 A | * | 10/1997 | Dosaka et al. | 365/230.03 |
| 5,721,862 A | * | 2/1998 | Sartore et al. | 365/189.04 |
| 5,819,305 A | * | 10/1998 | Nixon | 711/100 |
| 5,822,755 A | * | 10/1998 | Shippy | 711/118 |
| 5,835,941 A | * | 11/1998 | Pawlowski | 711/117 |
| 5,835,956 A | * | 11/1998 | Park et al. | 711/167 |
| 5,850,632 A | * | 12/1998 | Robertson et al. | 711/170 |

FOREIGN PATENT DOCUMENTS

EP          0325420      * 7/1989      ............ G06F/12/00

* cited by examiner

Primary Examiner—Pierre-Michel Bataille

(57) ABSTRACT

An integrated circuit having a memory which is reconfigurable as a main memory or as a cache. The integrated circuit may be a microprocessor chip with a memory that is reconfigurable to operate as an on-chip main memory or as an on-chip cache. Alternatively, the integrated circuit may be a stand-alone memory chip that is reconfigurable to operate as a main memory or as a cache.

16 Claims, 5 Drawing Sheets

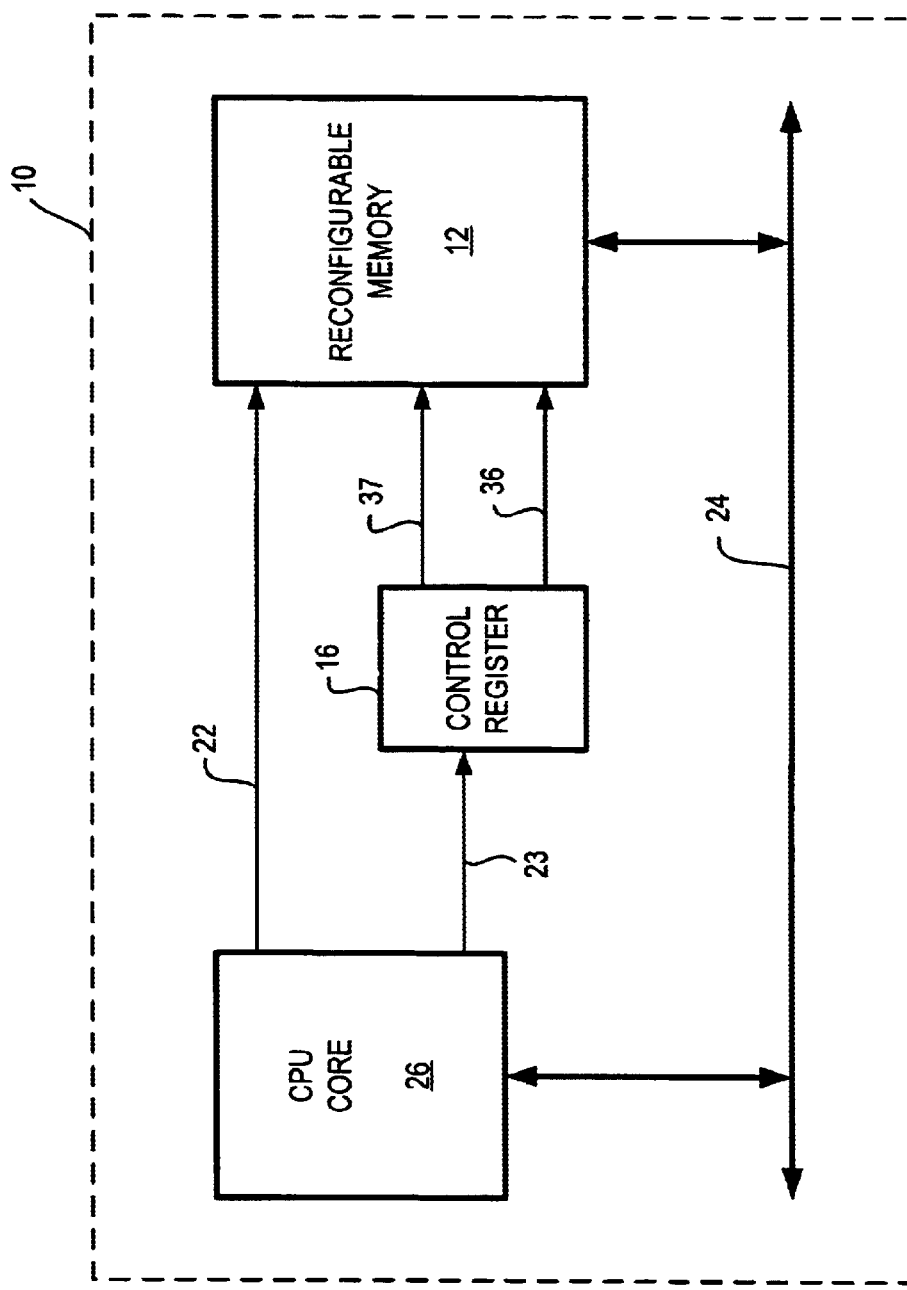

MICROPROCESSOR CHIP HAVING A MEMORY THAT IS RECONFIGURABLE TO FUNCTION AS ON-CHIP MAIN MEMORY OR AN ON-CHIP CACHE

BACKGROUND OF THE INVENTION

1. Field of Invention

The present invention pertains to the field of computer memories. More particularly, this invention relates to a memory that can be reconfigurable to function as a cache or as main memory.

2. Art Background

Prior computer systems typically include a central processing unit (CPU) along with a main memory. The main memory typically provides general purpose storage of instructions and data for the CPU.

In addition, prior computer systems may include a cache memory. Typically, a cache memory is a fast memory which is closely coupled with the CPU. Such a cache memory usually holds a subset of the instructions and/or data contained in the main memory. A cache memory typically improves the performance of the computer system by providing the CPU with fast access to instructions and/or data.

The CPU in prior computer systems is commonly implemented on a single integrated circuit chip which may be referred to as a microprocessor chip. In addition, prior microprocessor chips may include an on-chip memory such as an on-chip cache memory or an on-chip main memory.

Microprocessor chips having an on-chip cache memory are commonly employed in high performance computer systems. Such computer systems usually include a main memory contained in memory chips separate from the microprocessor chip. Such separate main memory chips can provide a large main memory for high performance applications.

In contrast, microprocessor chips having an on-chip main memory are commonly employed in low cost or portable computer systems. A microprocessor chip having an on-chip main memory usually limits the overall component count and cost of the system by eliminating the extra main memory chips.

Similarly, in the prior art, some memory chips are designed to operate as main memory chips and others are designed to operate as cache memory chips. Prior art memory chips are not reconfigurable to operate as either cache or main memory.

Typically, a manufacturer of such microprocessor chips undertakes a separate microprocessor design process for each type of microprocessor chip. Similarly, a manufacturer of memory chips undertakes a separate design for each type of memory chip. For example, chip layout and processing steps for a microprocessor with an on-chip cache memory usually differ from the chip layout and design steps for a microprocessor with an on-chip main memory. Similarly, the layout and design steps of a cache memory chip differs from the layout and design steps of a main memory chip. Unfortunately, such differing design processes typically increases the overall cost of such microprocessor and memory chips and extends time required to bring such chips to market. In addition, such extra design efforts usually increase the costs and complexities of chip testing and support.

SUMMARY OF THE INVENTION

A memory chip is disclosed having a memory which is reconfigurable as a main memory or as a cache memory. The memory chip may be a microprocessor chip having a memory reconfigurable to operate as a main memory or as a cache, or it may be a stand-alone memory chip that is thus reconfigurable. The chip is a product of a single chip design process and is suitable for application to a wide range of computer systems or computer-related device products.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 1(a) illustrates a microprocessor chip having a reconfigurable memory that functions as an on-chip main memory or an on-chip cache memory;

DETAILED DESCRIPTION

Figure 1B:
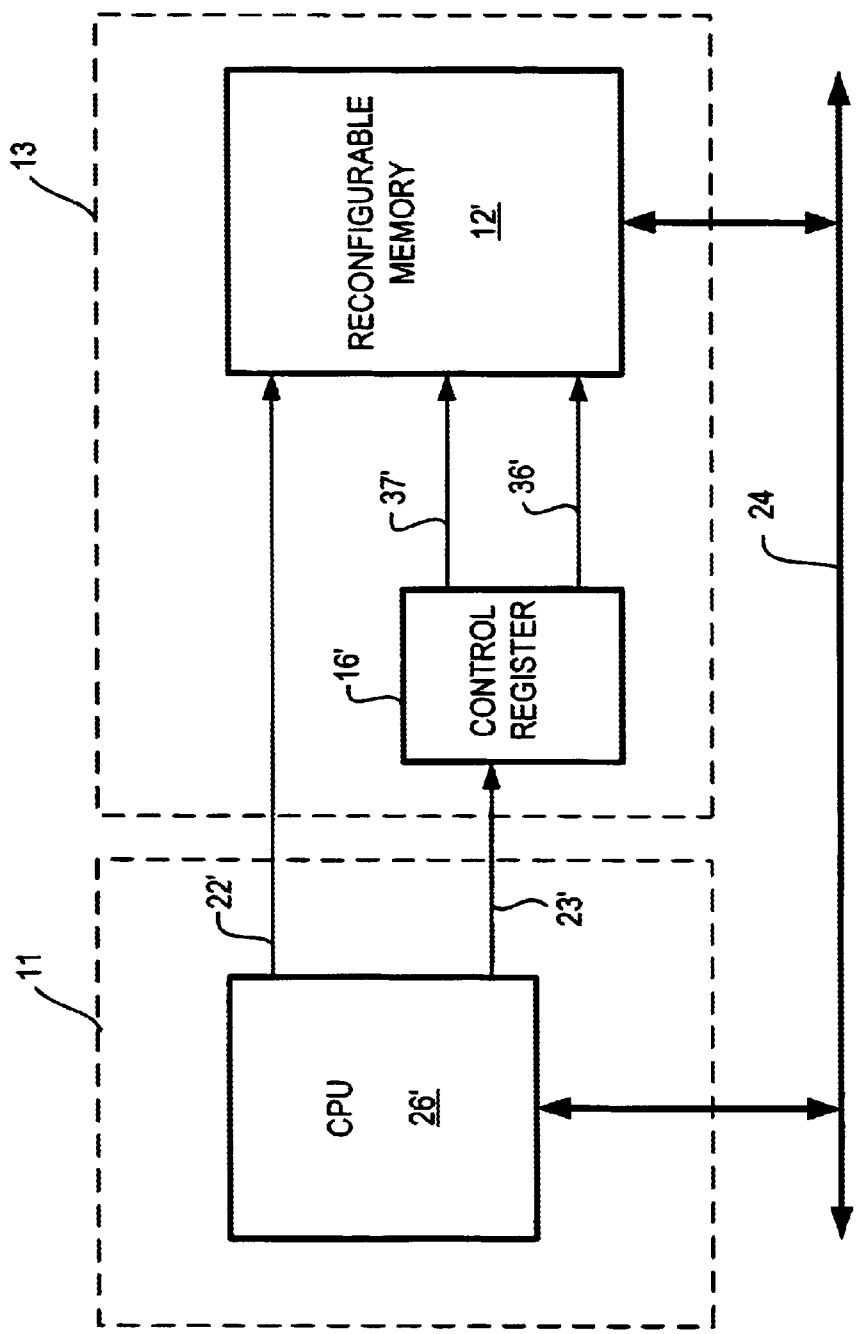
FIG. 1(b) illustrates an alternative embodiment of the CPU core and the reconfigurable memory, each located on separate chips.

FIG. 1(a) illustrates a microprocessor chip 10 having a reconfigurable memory 12 that functions as an on-chip main memory or an on-chip cache memory. The microprocessor chip 10 also includes a CPU core 26 which accesses the reconfigurable memory 12 via an address bus 22 and a data bus 24. The reconfigurable memory 12 when configured as a cache memory may be a data cache, an instruction cache, or a unified data/instruction cache.

The microprocessor chip 10 includes a control register 16 that holds an indication of whether the reconfigurable memory 12 is a main memory or a cache memory. This indication in one embodiment is a cache/main access control bit. The logic state of the cache/main access control bit in the control register 16 is carried by a control signal 36.

The cache/main access control bit in one embodiment is stored in the control register 16 under software control. For example, the CPU core 26 may execute a software instruction for loading the control register 16 that sets or clears the cache/main access control bit. In another embodiment, the microprocessor chip 10 includes circuitry (not shown) for sampling the logic state of one of its input pins which on power-up determines the state of the cache/main access control bit in the control register 16. The control register 16 may also store a predetermined base address for the reconfigurable memory 12 for use when configured as a main memory. The predetermined base address in one embodiment is loaded into the control register 16 under software control. The default value for the predetermined base address is zero.

The CPU core 26 may set the cache/main access control bit and load the base address into the control register 16 via control register signal lines 23.

The CPU core 26 transfers physical addresses via the address bus 22 while fetching either instructions or data. The reconfigurable memory 12 examines the physical addresses carried on the address bus and the control signal 36. The reconfigurable memory 12 drives data onto the data bus 24 in response to valid physical addresses for cached data or valid physical addresses for main memory data depending on the indication carried by the control signal 36.

The reconfigurable memory 12 may also accept as input a base address for the data elements stored in the memory 12. The base address is transferred to the reconfigurable memory 12 via the address lines 37.

In an alternative embodiment, shown in FIG. 1(*b*), the CPU core 26' (corresponding to the CPU core 26), and the reconfigurable memory 12' (corresponding to the reconfigurable memory 12) are each located on separate chips 11 and 13.

Each element 12', 16', 22', 23', 24', 26', 36', and 37' correspond to elements 16, 22, 23, 24, 36, and 37, respectively. Accordingly, the description herein of elements 16, 22, 23, 24, 36, and 37 also applies to their corresponding elements.

Figure 2:
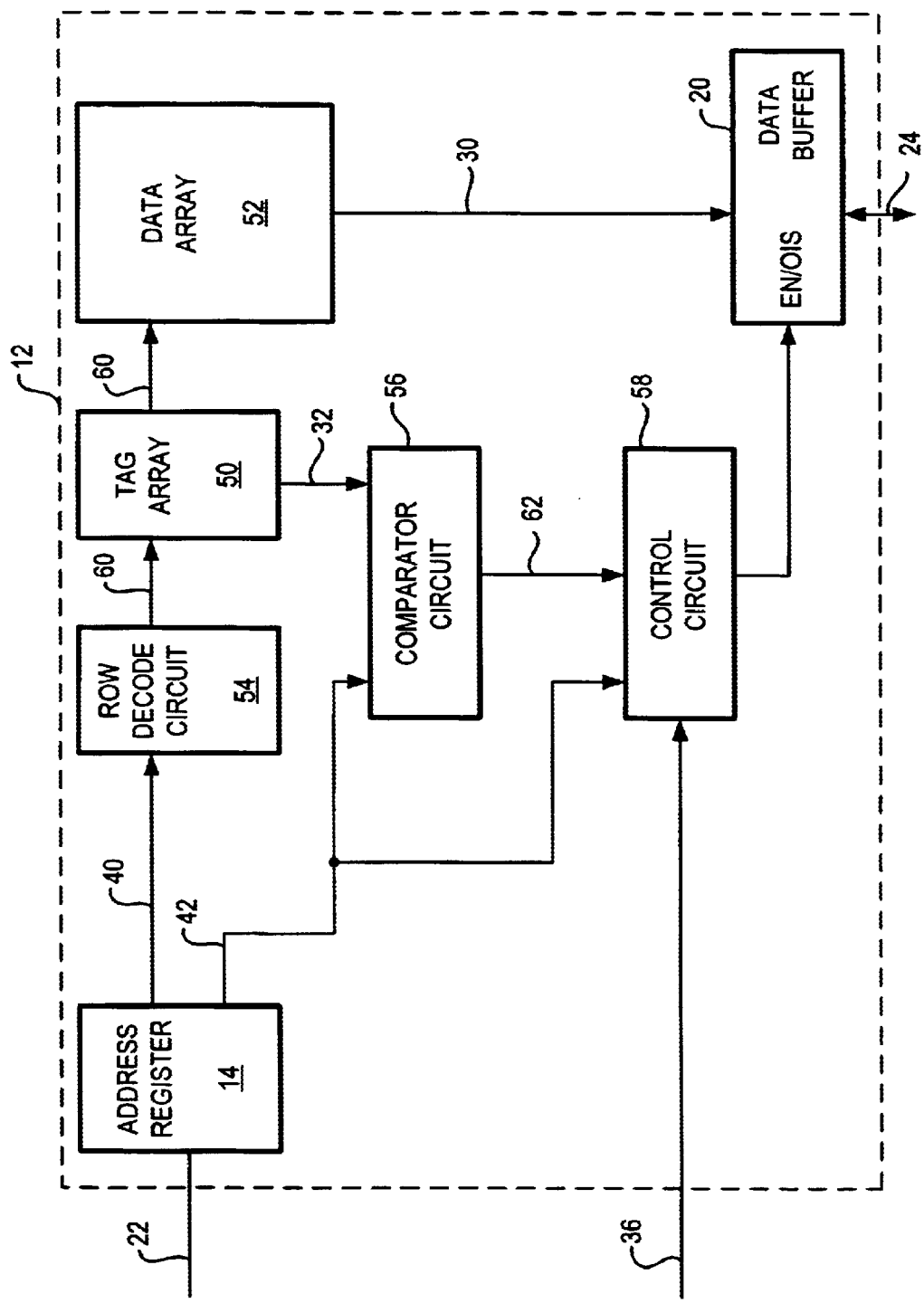
FIG. 2 illustrates an embodiment of the reconfigurable memory which functions as either a direct-mapped cache memory or a main memory.

FIG. 2 illustrates one embodiment of the reconfigurable memory 12 which functions as either a direct-mapped cache memory or a main memory. The reconfigurable memory 12 in this embodiment includes a tag array 50, a data array 52, a row decoder circuit 54, an address register 14, a data buffer 20, a comparator circuit 56, a base address comparator 39, and a control circuit 58.

The data array 52 includes n rows of memory cells, each row for storing a data line. The data lines in the data array 52 may also be referred to as data blocks or data words. The tag array 50 includes n rows of memory cells for storing sets of tags. Each row of the tag array 50 corresponds to one of the data lines in the data array 52. The tag array 50 and the data array 52 may be implemented as static random access memory (SRAM) cells or dynamic random access memory (DRAM) cells.

The address register 14 holds a physical address which is received via the address bus 22. The physical address held in the address register 14 is used to select rows of the tag array 50 and the data array 52. The physical address in the address register 14 is subdivided into a set of tag bits 42, a set of index bits 40, and a set of offset bits. The offset bits of the physical address in the address register 14 specify subareas, such as bytes or words, of the data lines in the data array 52.

The row decode circuit 54 decodes the index bits 40 held by the address register 14 and drives a set of word lines 60 coupled to the tag array 50 and the data array 52. The particular row of the data array 52 selected by the word lines 60 provides a set of data bits 30 which may or may not be valid. The particular row of the tag array 50 selected by the word lines 60 provides a set of tag bits 32.

The comparator circuit 56 compares the tag bits 42 from the address register 14 to the tag bits 32 from the tag array 50. The comparator circuit 56 asserts a cache_hit signal 62 if the tag bits 42 match the tag bits 32. The control circuit 58 generates a valid signal 34 in response to the control signal 36 and the cache_hit signal 62. The valid signal 34 enables or disables the data buffer 20.

The control circuit 58 asserts the valid signal 34, thereby enabling the data bits 30 onto the data bus 24, if the control signal 36 indicates that the reconfigurable memory 12 is a cache memory and if the cache_hit signal 62 is asserted to indicate a cache hit. The control circuit 58 deasserts the valid signal 34 to disable the data buffer 20 if the control signal 36 indicates a cache memory and the cache_hit signal 62 indicates a cache miss.

The address of a data element being accessed from address register 14 is input into the base address comparator 39. The base address 37, from the control register 16 (or 16') and the control signal 36 are also input into the base address comparator 39. If the control signal 36 indicates that the reconfigurable memory 12 is operating in main memory mode, the base address comparator 39 compares the base address 37 to the corresponding address bits of the address 15 and indicates a match on a valid address signal line 41. If the valid address signal line 41 indicates a match, the reconfigurable memory 12 contains the data element corresponding to the address held in address register 14.

In addition, the control circuit 58 asserts the valid signal 34 to enable the data buffer 20 if the control signal 36 indicates that the reconfigurable memory 12 is a main memory and if the valid address signal line 41 indicates that the corresponding bits of address 15 match the predetermined base address of the reconfigurable memory 12. The control circuit 58 deasserts the valid signal 34 to disable the data buffer 20 if the control signal 36 indicates that the reconfigurable memory 12 is a main memory and if the corresponding bits of address 15 do not match the predetermined base address of the reconfigurable memory 12, i.e. due to an illegal address.

Figure 3:
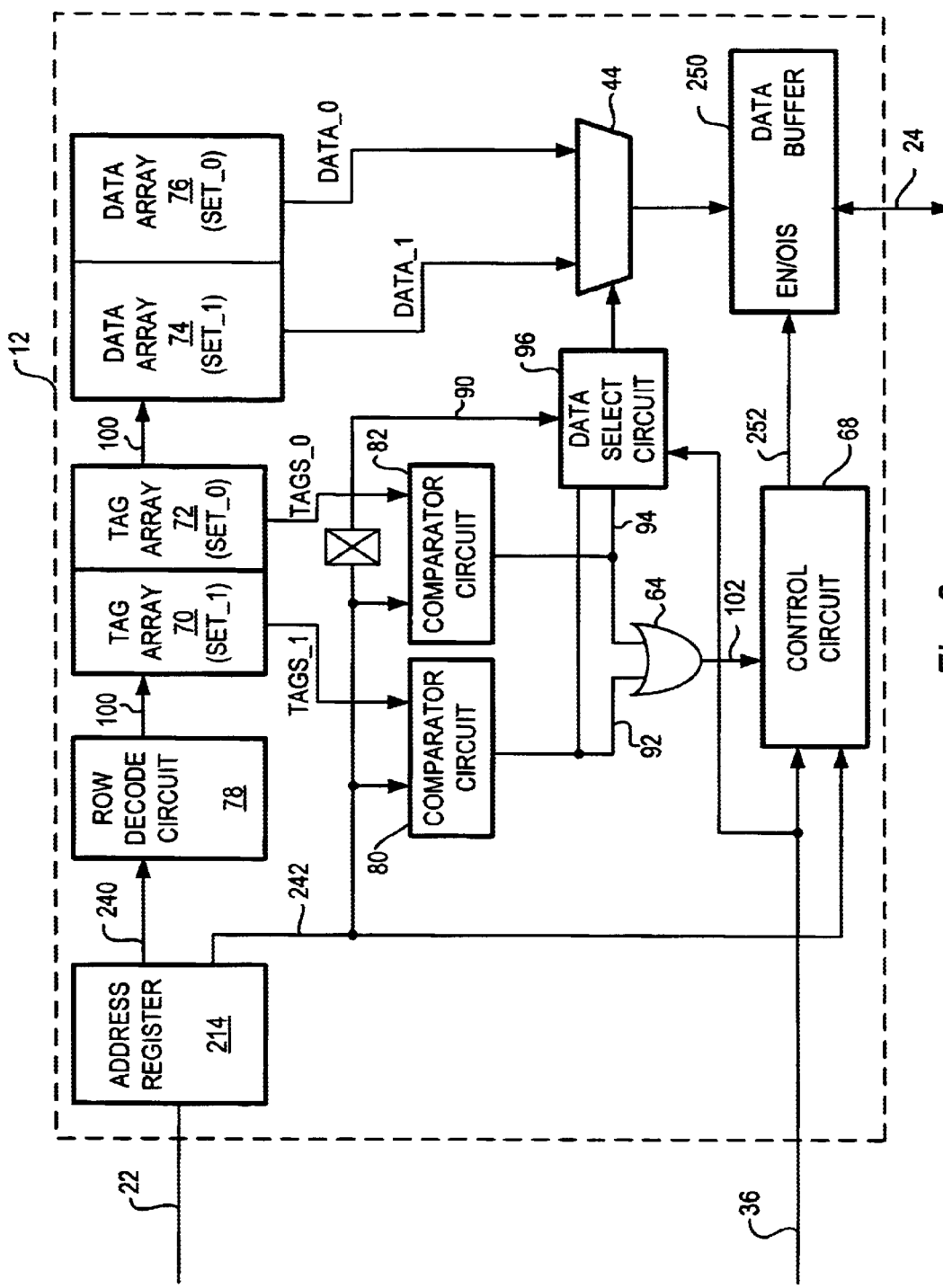
FIG. 3 illustrates an embodiment of the reconfigurable memory which functions as a 2-way set associative cache memory or a main memory.

FIG. 3 illustrates another embodiment of the reconfigurable memory 12 which functions as a 2-way set associative cache memory or a main memory. The reconfigurable memory 12 in this embodiment includes a pair of tag arrays 70–72, a pair of data arrays 74–76, a row decode circuit 78, and an address register 214. The tag arrays 70–72 and the data arrays 74–76 may be implemented as SRAM arrays or DRAM arrays. The reconfigurable memory 12 also includes a pair of comparator circuits 80–82, an OR logic gate 64, a control circuit 68, a data select circuit 96, a multiplexor 44, and a data buffer 250.

The data arrays 74 and 76 each include n rows. Each row of the data array 74 and each row of the data array 76 holds a data line. The data array 76 holds set_0 data lines and the data array 74 holds set_1 data lines. The tag array 70 includes n rows each holding a set of tag bits for a corresponding row of the data array 74. The tag array 72 includes n rows each holding a set of tag bits for a corresponding row of the data array 76.

The address register 214 holds a physical address which is received via the address bus 22. The physical address in the address register 214 is subdivided into a set of tag bits 242, a set of index bits 240, and a set of offset bits which specify subareas of the data lines in the data arrays 74 and 76.

The row decode circuit 78 decodes the index bits 240 held by the address register 214 and drives a set of word lines 100 coupled to the tag arrays 70–72 and the data arrays 74–76. The particular rows of the data arrays 74–76 selected by the word lines 100 provides a set of set_0 data bits (DATA_0) and a set of set_1 data bits (DATA_1). The data bits DATA_0 and DATA_1 are selected by the multiplexer 44 for input to the data buffer 250.

The particular rows of the tag array 70 and the tag array 72 selected by the word lines 100 provides the set_1 tag bits (TAGS_1) and the set_0 tag bits (TAGS_0), respectively. The TAGS_1 and TAGS_0 tag bits provide inputs to the comparators 80 and 82, respectively.

The comparator circuit 80 compares the tag bits 242 from the address register 214 to the TAGS_1 tag bits. The comparator circuit 80 asserts a cache_hit signal 92 if the tag bits 242 match the TAGS_1 tag bits. The comparator circuit 82 compares the tag bits 242 to the TAGS_0 tag bits and asserts a cache_hit signal 94 if the tag bits 242 match the TAGS_0 tag bits. The cache_hit signal 92 and the cache_hit signal 94 are Or'd together by the logic gate 64 to provide a cache_hit signal 102.

The control circuit 68 asserts a valid signal 252, thereby enabling the data bits selected by the multiplexer 44 onto the data bus 24, if the control signal 36 indicates that the reconfigurable memory 12 is a cache memory and if the cache_hit signal 102 is asserted to indicate a cache hit. The control circuit 68 deasserts the valid signal 252, thereby disabling the data buffer 250, if the control signal 36 indicates that the reconfigurable memory 12 is a cache memory and if the cache$_{13}$ hit signal 102 indicates a cache miss.

In addition, the control circuit 68 asserts the valid signal 252 to enable the data buffer 250 if the control signal 36 indicates that the reconfigurable memory 12 is a main memory and if all but the lowest order bit of the tag bits 242 match the predetermined base address of the reconfigurable memory 12. If the control signal 36 indicates that the reconfigurable memory 12 is a main memory and if all but the lowest order bit of the tag bits 242 do not match the predetermined base address of the reconfigurable memory 12, then the control circuit 68 deasserts the valid signal 252 to disable the data buffer 250 due to an illegal address.

The data select circuit 96 causes the multiplexor 44 to select either the DATA_0 or the DATA_1 data bits based upon the control signal 36, the cache_hit signals 92–94, and a low order tag bit 90 of the tag bits 242. The data select circuit 96 causes the multiplexer 44 to select the DATA_0 data bits if the control signal 36 indicates that the reconfigurable memory 12 is a cache memory and the cache_hit signal 94 indicates a set_0 cache hit. The data select circuit 96 causes the multiplexer 44 to select the DATA_1 data bits if the control signal 36 indicates that the reconfigurable memory 12 is a cache memory and the cache hit signal 92 indicates a set_1 cache hit.

In addition, the data select circuit 96 causes the multiplexer 44 to select the DATA_0 data bits if the control signal 36 indicates that the reconfigurable memory 12 is a main memory and the low order tag bit 90 is a zero. The data select circuit 96 causes the multiplexer 44 to select the DATA_1 data bits if the control signal 36 indicates that the reconfigurable memory 12 is a main memory and the low order tag bit 90 is a one.

The arrangement shown is readily adapted to n-way set associative cache memory designs. For example, the reconfigurable memory 12 can function as either a main memory or a 4-way set associative cache memory with addition of two more tag arrays and two more data arrays along with two more comparator circuits and an expanded OR gate for combining the cache_hit signal.

Figure 4:
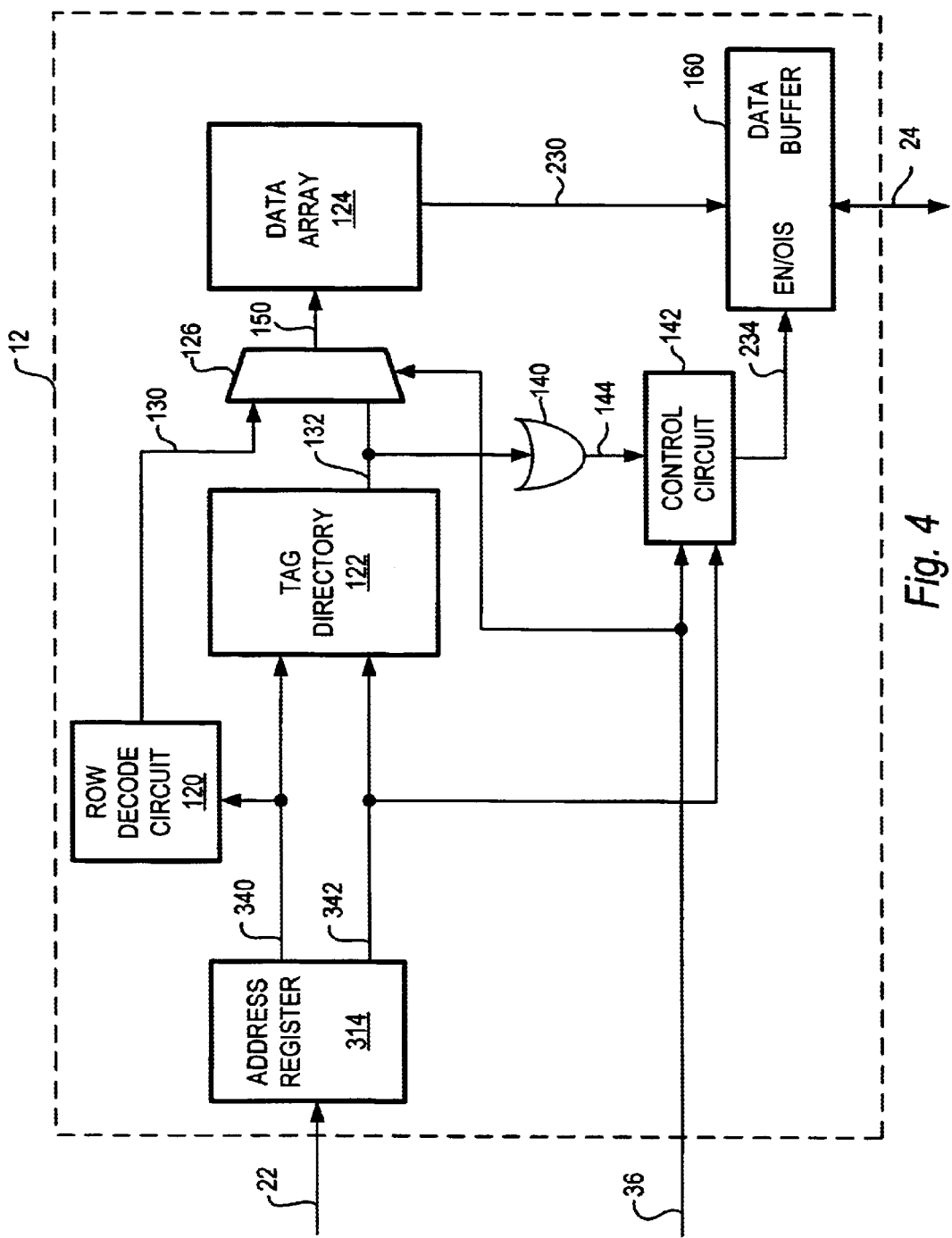
FIG. 4 illustrates an embodiment of the reconfigurable memory which functions as a fully-associative cache memory or a main memory.

FIG. 4 illustrates an embodiment of the reconfigurable memory 12 which functions as a fully-associative cache memory or a main memory. The reconfigurable memory 12 in this embodiment includes a tag directory 122, a data array 124, an address register 314, a row decode circuit 120, and a multiplexor 126, an OR logic circuit 140, a control circuit 142, and a data buffer 160. The data array 124 includes n rows each holding a data line. The data array 124 may be implemented as an SRAM array or a DRAM array.

The address register 314 holds a physical address which is received via the address bus 22. The physical address in the address register 314 is subdivided into a set of tag bits 342, a set of index bits 340, and a set of offset bits which specify subareas of the data lines in the data array 124.

The tag directory 122 is a content addressable memory (CAM) which may be implemented with either DRAM or SRAM memory cells. Each entry in the tag directory 122 is capable of storing a set of tag bits for a corresponding data line in the data array 124. The tag directory 122 drives a set of match lines 132 that indicate which, if any, of the entries in the tag directory 122 match the combination of index bits 340 and tag bits 342 stored in the address register 314.

The row decode circuit 120 decodes the index bits 340 held by the address register 314 and provides a set of decode lines 130. The multiplexor 126 drives a set of word lines 150 by selecting either the decode lines 130 or the match lines 132 from the tag directory 122 in response to the control signal 36. The multiplexor 126 selects the decode lines 130 if the control signal 36 indicates that the reconfigurable memory 12 is a main memory. The multiplexor 126 selects the match lines 132 if the control signal 36 indicates that the reconfigurable memory 12 is a cache memory. The particular row of the data array 124 selected by the word lines 150 provides a set of data bits 230 which are input to the data buffer 160.

The OR logic circuit 140 ORs together the match lines 132 to provide a cache_hit signal 144.

The control circuit 142 asserts a valid signal 234, thereby enabling the data bits 230 onto the data bus 24, if the control signal 36 indicates that the reconfigurable memory 12 is a cache memory and the cache_hit signal 144 indicates a cache hit. The control circuit 142 deasserts a valid signal 234, thereby disabling the data buffer 160, if the control signal 36 indicates that the reconfigurable memory 12 is a cache memory and the cache hit_signal 144 indicates a cache miss.

In addition, the control circuit 142 asserts the valid signal 234 to enable the data bits 230 onto the data bus 24 if the control signal 36 indicates that the reconfigurable memory 12 is a main memory and the tag bits 342 match the predetermined base address of the reconfigurable memory 12. The control circuit 142 deasserts the valid signal 234 if the control signal 36 indicates that the reconfigurable memory 12 is a main memory and the tag bits 342 do not match the predetermined base address of the reconfigurable memory 12.

If a cache miss occurs, then a cache line fill operation is undertaken to fetch the missing data line and write the missing data line into the data array 124. A variety of known replacement algorithms may be implemented to select an entry in the data array 124 in which to write the new data line. The selected address for the new data line is decoded by the row decode circuit 120 and the decode lines 130 drive the word lines 150 through the multiplexor 126 while writing the new data line to the data array 124.

In other embodiments, the reconfigurable memory 12 may be a multiported memory with the addition of extra address registers and decode circuitry for the additional ports. The tags arrays described above may be used for other functions such as storing error correction and control (ECC) bits when the reconfigurable memory 12 is functioning as a main memory. The tags arrays could also be used as a full directory for cache coherance when reconfigurable memory is functioning as a main memory in a distributed shared-memory computer system.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A microprocessor chip, comprising:
   CPU core that generates an address via an address bus and obtains data corresponding to the address via a data bus;
   on-chip memory that includes a tag array and a data array wherein the data array holds cache data if the on-chip memory is an on-chip cache and holds main memory data if the on-chip memory is an on-chip main memory;
   register that holds an indication of whether the on-chip memory is the on-chip cache or the on-chip main memory;
   means for loading a base address for the on-chip main memory under software control;
   circuit that reads a set of tag bits from the tag array and a set of data bits from the data array in response to the address;
   circuit that generates a cache hit signal to indicate a cache hit if a tag portion of the address matches the tag bits and generates the cache hit signal to indicate a cache miss otherwise;
   means for comparing the base address for the on-chip main memory to the tag portion of the address;
   circuit that drives the data bits from the data array onto the data bus if the on-chip memory is the on-chip cache and the cache hit signal indicates the cache hit or if the on-chip memory is the on-chip main memory and the tag portion matches the base address of the on-chip memory and not otherwise.

2. The microprocessor chip of claim 1, wherein the data array comprises an array of dynamic random access memory (DRAM) cells.

3. The microprocessor chip of claim 1, wherein the data array comprises an array of static random access memory (SRAM) cells.

4. The microprocessor chip of claim 1, wherein the tag array comprises an array of DRAM cells.

5. The microprocessor chip of claim 1, wherein the tag array comprises an array of SRAM cells.

6. The microprocessor chip of claim 1, wherein the circuit that reads the tag bits from the tag array provides a direct-mapping to the tag array.

7. The microprocessor chip of claim 1, wherein the circuit that reads the tag bits from the tag array provides a set-associative mapping to the tag array.

8. The microprocessor chip of claim 1, wherein the circuit that reads the tag bits from the tag array provides a fully-associative mapping to the tag array.

9. The microprocessor chip of claim 1, wherein the means for loading a base address of the on-chip memory includes the register.

10. The microprocessor chip of claim 9, wherein the CPU core executes a software instruction for loading the base address in the register.

11. The microprocessor chip of claim 1, wherein the CPU core executes a software instruction for loading the indication in the register.

12. The microprocessor chip of claim 1, wherein the tag array and the data array provide a data cache when the on-chip memory is the on-chip cache.

13. The microprocessor chip of claim 1, wherein the tag array and the data array provide an instruction cache when the on-chip memory is the on-chip cache.

14. The microprocessor chip of claim 1, wherein the tag array and the data array provide a unified data and instruction cache when the on-chip memory is the on-chip cache.

15. The microprocessor chip of claim 1, wherein the tag array is a content-addressable memory.

16. The microprocessor chip of claim 1, wherein the indication is obtained from a logic state of an input pin of the microprocessor chip on power-up.

* * * * *